United States Patent Office 3,059,883
Patented Oct. 23, 1962

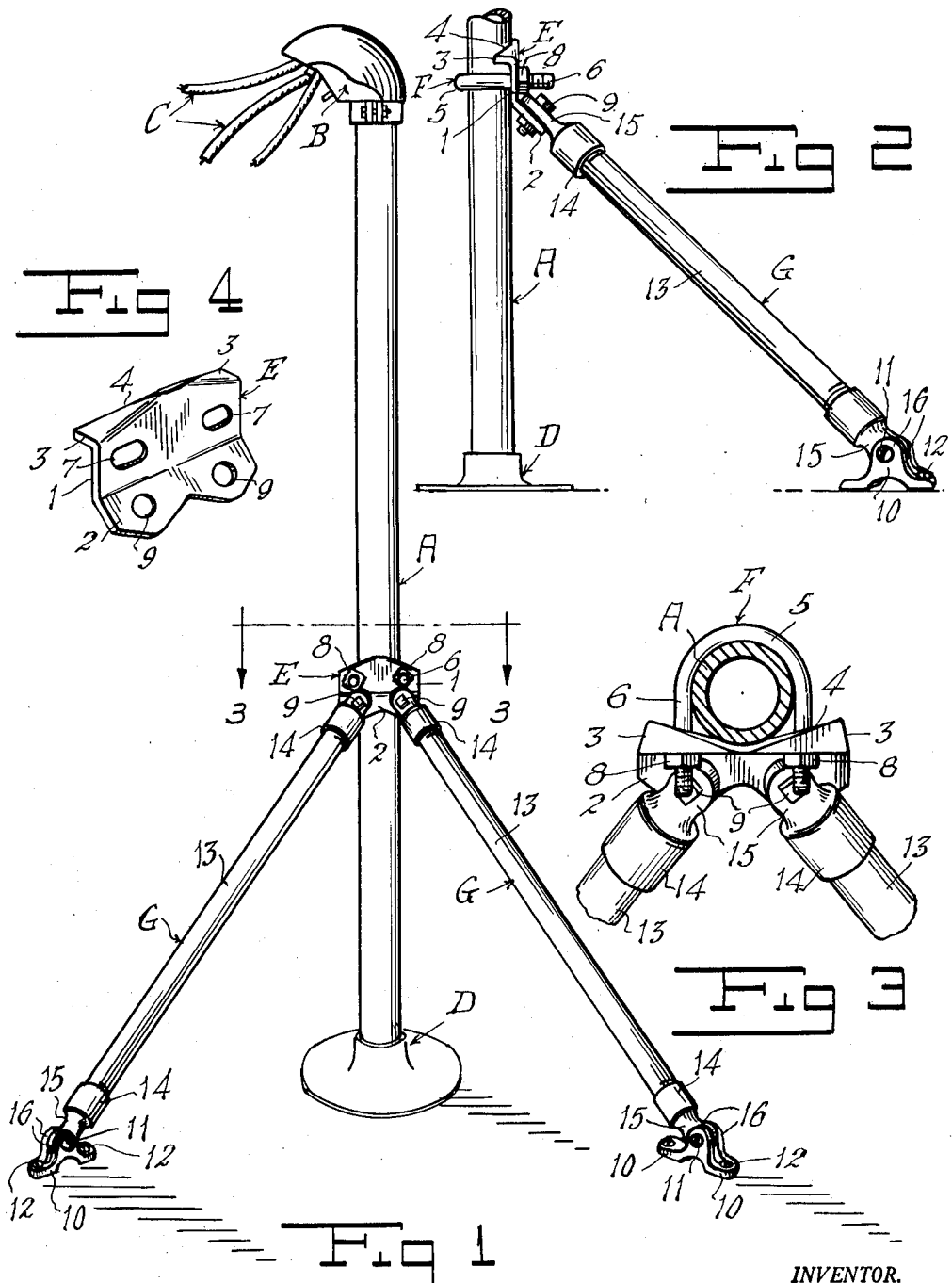

3,059,883
SUPPORT FOR ELECTRICAL SERVICE
STANDPIPE
Roy A. Matthiessen, 30 Sandy Hill Road, Westfield, N.J.
Filed Aug. 31, 1959, Ser. No. 837,003
1 Claim. (Cl. 248—49)

This invention relates particularly to a support for holding a rod or pipe, such as an electrical service standpipe, in vertical position on a horizontal surface such as a floor or roof, although the invention contemplates a support for other uses, which shall include a combination of supporting legs or braces and a clamp for fastening them to a rod, pipe or the like to be supported in upright position.

A primary object of the invention is to provide a support of this character which shall provide for easy and quick adjustment of the support relative to a standpipe or the like and to a supporting surface such as a roof, and for secure fastening of the support to the standpipe and to said supporting surface, thereby to ensure a strong and stable mounting of the standpipe.

Another object is to provide a support of this character that shall include a clamp that easily is slidably adjustable, and yet can be tightly secured, on the rod or pipe being supported and shall have pivotally connected thereto one end of each of at least two legs the other ends of which have feet pivotally connected thereto for securing the legs to a supporting surface such as a roof.

A further object is to provide in such a support, a novel and improved clamp that shall comprise a plate of sheet metal bent to form a main flat portion to abut the standpipe or the like and a leg-attaching flange at one edge thereof for connection to legs, and a U-bolt to partially embrace the standpipe or the like and whose arms pass through openings in the said main portion and have nuts threaded thereon to clamp the U-bolt and plate in tight frictional engagement with the standpipe.

Still another object is to provide in a clamp of the character described having positioning flanges at the edge of said main portion of plate opposite the leg-attaching flange and having their edges in V-shaped angular relation to each other to partially embrace the side of a standpipe or the like opposite the bight or loop portion of the U-bolt, whereby the clamp can be easily and quickly locked on the standpipe, and said positioning flanges cooperate with the U-bolt to firmly hold the plate against movement laterally of the standpipe.

Other objects are to provide such a support embodying novel features of construction whereby it can be used with pipes or the like of different sizes and easily can be provided with legs of different lengths, and to obtain other advantages and results that will be brought out by the following description in conjunction with the accompanying drawing in which FIGURE 1 is a front perspective view of an electrical service standpipe and a support therefor embodying the invention.

FIGURE 2 is a side elevation of the support and the lower portion of the standpipe.

FIGURE 3 is an enlarged fragmentary horizontal sectional view approximately on the plane of the line 3—3 of FIGURE 1.

FIGURE 4 is a detached perspective view of the plate of the support.

Specifically describing the illustrated embodiment of the invention, the reference character A designates a rod, shaft or other part that in the present instance is shown as a standpipe for electrical service which has a head B through which supply wires C are led into and extend downwardly through the standpipe and into a building to which electrical service is to be supplied, the standpipe usually being set with its lower end on the surface of the roof and surrounded by suitable flashing D.

The support embodying the invention includes an elongated plate E of thick sheet metal that has a main portion in a flat plane 1 from one edge of which extends a leg-attaching flange 2 obliquely to said plane of the main portion and from the opposite edge of which extends positioning flanges 3 whose free edges converge toward each other and meet at the center of the length of the plate in shallow V-shaped relation as indicated at 4.

Cooperating with the plate E is a U-bolt F the bight, loop or bend 5 of which is approximately of the same diameter as the standpipe A so as to partially embrace the standpipe, the arms 6 of said U-bolt loosely passing through openings 7 in the main portion of the plate and having nuts 8 screw-threaded thereon in abutting relation to the side of the plate opposite the bight of the bolt as best shown in FIGURE 3. Preferably the openings 7 are in the form of elongated slots to accommodate bolts of different sizes which may be used with pipes of different diameter.

Coacting with the clamp plate E are a pair of legs G one end of each of which is pivotally attached to the leg-attaching flange 2 by a bolt 9 and the other end of which has a foot 10 pivotally connected thereto. The axes of the pivot bolts 9 are approximately perpendicular to the plane of the leg-attaching flange 2 which is in turn obliquely disposed to the main portion E of the plate and the axis of the standpipe, so that the legs are disposed in inclined relation to the standpipe and may be swung toward or from each other to vary the angular relation thereof to each other and to the standpipe. The axis of pivoting of the foot 10 to each leg, indicated by the bolt 11, is approximately perpendicular to the longitudinal axis of the leg so that the angularity of the legs with respect to the vertical may be varied. Each foot has at least one aperture through which a screw or other fastening element 12 may be inserted into the roof or other supporting surface for firmly attaching the leg of the support thereto.

Preferably the legs are constructed so that their length may be changed easily and quickly, and as shown, each leg includes a length of pipe 13 to each of opposite ends of which is screw threaded a cap fitting 14 having a flat transversely perforated extension 15. One of the bolts 9 is inserted through the aperture of the extension 15 of the cap fitting at one end of each of the legs and the extension 15 of the cap fitting at the other end of each leg is loosely inserted between the lugs 16 of the corresponding foot with the bolt 11 inserted through apertures in said lugs and the aperture in said extension.

In use of the support, the plate E and the U-bolt F are applied to the standpipe from opposite sides of the latter with one side of the standpipe partially embraced by the positioning flanges 3 and the other side partially embraced by the U-bolt, as best shown in FIGURE 3. The legs G are pivotally connected to the leg-attaching flange 2 and swung into proper angular relation to hold the standpipe in the desired position, the nuts on the U-bolt being then tightened to tightly clamp the plate and U-bolt in position on the standpipe, and the feet 10 being secured to the roof or other supporting surface by the fastening elements 12. It will be observed that the pivotal connections of the legs to the plate E and of the feet to the legs provide for easy and quick angular adjustment of the legs with respect to the standpipe and the supporting surface, and the relative rotation of the cap fittings and the pipes 13 provide for easy and quick adjustment of the apertures in the extensions 15 with respect to the apertures 9 in the leg-attaching flange and to the apertures in the lugs 16 of the feet 10. Also the screw-threaded connections of the pipes 13 to the fittings provide for substantial adjustment in the length of the legs upon relative rotation of the fittings and pipes, and, as above indicated, pipes greatly varying in length may be interchanged to provide legs of different lengths.

I claim:

A support comprising a plate having a main portion in a flat plane and spaced apart openings therethrough, a U-bolt having a bight to receive a rod or pipe and spaced arms each of which extends through one of said openings, a nut screw-threaded on each of said arms at the side of said plate opposite said bight of the U-bolt for fastening said U-bolt and said plate on said rod or pipe, said main portion of the plate having a leg-attaching flange projecting from one margin of said main portion obliquely to the plane of said main portion, and a plurality of legs pivotally connected to said leg-attaching flange, there being flanges on the margin of said main portion of said plate opposite the first-mentioned margin whose edges converge toward the center of the last-mentioned margin in V-relation to each other.

References Cited in the file of this patent

UNITED STATES PATENTS

| | | |
|---|---|---|
| 836,043 | Kempf | Nov. 13, 1906 |
| 900,545 | Humiston | Oct. 6, 1908 |
| 1,617,400 | Lanning | Feb. 15, 1927 |
| 1,661,930 | Dietrich | Mar. 6, 1928 |
| 2,296,217 | Maloney | Sept. 15, 1942 |
| 2,556,460 | Ballam et al. | June 12, 1951 |
| 2,584,713 | Kanaval | Feb. 5, 1952 |
| 2,703,688 | Shuter | Mar. 8, 1955 |
| 2,907,543 | Heinzen | Oct. 6, 1959 |
| 2,914,279 | Bales | Nov. 24, 1959 |
| 2,971,735 | Johnson | Feb. 14, 1961 |